US011931873B2

(12) United States Patent
Chien

(10) Patent No.: US 11,931,873 B2
(45) Date of Patent: Mar. 19, 2024

(54) NAIL-STRIKING DEVICE AND NAIL GUN HAVING THE SAME

(71) Applicant: BASSO INDUSTRY CORP., Taichung (TW)

(72) Inventor: Chia-Yu Chien, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 160 days.

(21) Appl. No.: 17/744,288

(22) Filed: May 13, 2022

(65) Prior Publication Data

US 2022/0371166 A1 Nov. 24, 2022

(30) Foreign Application Priority Data

May 20, 2021 (TW) ................................ 110118276

(51) Int. Cl.
*B25C 1/06* (2006.01)
*B25C 1/00* (2006.01)

(52) U.S. Cl.
CPC ................ *B25C 1/008* (2013.01); *B25C 1/06* (2013.01)

(58) Field of Classification Search
CPC ................................. B25C 1/008; B25C 1/06
USPC ............................................................ 227/8
See application file for complete search history.

(56) References Cited

FOREIGN PATENT DOCUMENTS

| | | | |
|---|---|---|---|
| DE | 102005000062 | A1 | 11/2006 |
| DE | 112018000305 | T5 | 10/2019 |
| EP | 3156182 | A2 | 4/2017 |
| JP | 2020082302 | A | 6/2020 |
| TW | 200607617 | A | 3/2006 |

OTHER PUBLICATIONS

Search Report issued to European counterpart application No. 22174163.0 by the EPO dated Oct. 17, 2022.

*Primary Examiner* — Praachi M Pathak
(74) *Attorney, Agent, or Firm* — Burris Law, PLLC

(57) ABSTRACT

A nail gun includes a frame unit, a flywheel, and a nail-striking device that includes an actuation unit, an impact member and an accidental discharge prevention unit. The actuation unit includes a safety subunit. The impact member has a confining portion. The accidental discharge prevention unit includes a restraining member located between the confining portion of the impact member and the safety subunit. The actuation unit is operable to convert the restraining member from a restraining state, in which the restraining member restrains movement of the confining portion of the impact member, to a releasing state, in which the movement of the confining portion of the impact member is permitted.

11 Claims, 13 Drawing Sheets

NAIL-STRIKING DEVICE AND NAIL GUN HAVING THE SAME

CROSS-REFERENCE TO RELATED APPLICATION

This application claims priority to Taiwanese Invention Patent Application No. 110118276, filed on May 20, 2021.

FIELD

The disclosure relates to a power tool, and more particularly to a nail-striking device for preventing accidental discharges and a nail gun having the same.

BACKGROUND

A conventional flywheel nail gun generally includes a motor, a flywheel, an arm assembly and an impact member. The motor drives the flywheel to rotate. The arm assembly is operable to push the impact member downwardly so as to bring the impact member into contact with the rotating flywheel. When the impact member is in contact with the rotating flywheel, the impact member is urged by the rotation of the flywheel to strike a nail.

Referring to FIGS. 1 and 2, in order to prevent accidental discharges, a power tool, such as a nailer (i.e., a nail gun), disclosed in Taiwanese Invention Patent Application Publication No. 200607617 includes a lock-out for an activation arm mechanism thereof. Specifically, the power tool includes an activation arm assembly 11, an actuating arm 12 and a strike-inhibiting rack 13. The strike-inhibiting rack 13 is disposed at one side of the activation arm assembly 11, and is co-movable with the actuating arm 12. When the actuating arm 12 is not pushed away from its initial position, the strike-inhibiting rack 13 abuts against the activation arm assembly 11 to inhibit the activation arm assembly 11 from moving downwardly, thereby preventing a driver (not shown) from accidentally striking the nail (not shown).

SUMMARY

Therefore, an object of the disclosure is to provide a nail-striking device having a configuration different from the abovementioned prior art.

According to the disclosure, the nail-striking device is adapted for use with a nail gun. The nail gun including a frame unit and a flywheel that is rotatably mounted to the frame unit. The nail-striking device includes an actuation unit, a swing arm unit, an impact unit and an accidental discharge prevention unit. The actuation unit is adapted to be mounted to the frame unit and operable for selectively actuating the flywheel, and includes a safety subunit that is adapted to be movably mounted to the frame unit, and that has a pushing surface adapted to be located in the frame unit. The swing arm unit has a pivot end that is adapted to be pivotably mounted to the frame unit, and a swing end that is opposite to the pivot end, and is adapted to be driven by the actuation unit to swing relative to the frame unit. The pivot end serves as a pivot when the swing arm unit swings. The impact unit is slidably mounted to the swing arm unit, is adapted to be moved by the swing arm unit to be in contact with the flywheel, and includes an impact member that is adapted to be urged by rotation of the flywheel to strike a nail when the impact unit is brought into contact with the flywheel, and that has a confining portion close to the pushing surface. The accidental discharge prevention unit is adapted to be mounted to the frame unit, and includes a restraining member that is located between the confining portion of the impact member and the pushing surface of the safety subunit. The actuation unit is further operable to convert the restraining member from a restraining state, in which the restraining member restrains movement of the confining portion of the impact member so that the impact member is prevented from moving, and in which the restraining member is in sliding contact with the pushing surface, to a releasing state, via sliding movement of the restraining member on the pushing surface. The movement of the confining portion of the impact member is permitted when the restraining member is in the releasing state.

Another object of the disclosure is to provide a nail gun having the abovementioned nail-striking device.

According to the disclosure, the nail gun includes a frame unit, a flywheel, and the nail-striking device as mentioned above. The flywheel is rotatably mounted to the frame unit. The nail-striking device is mounted to the frame unit and is adapted for striking nails.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
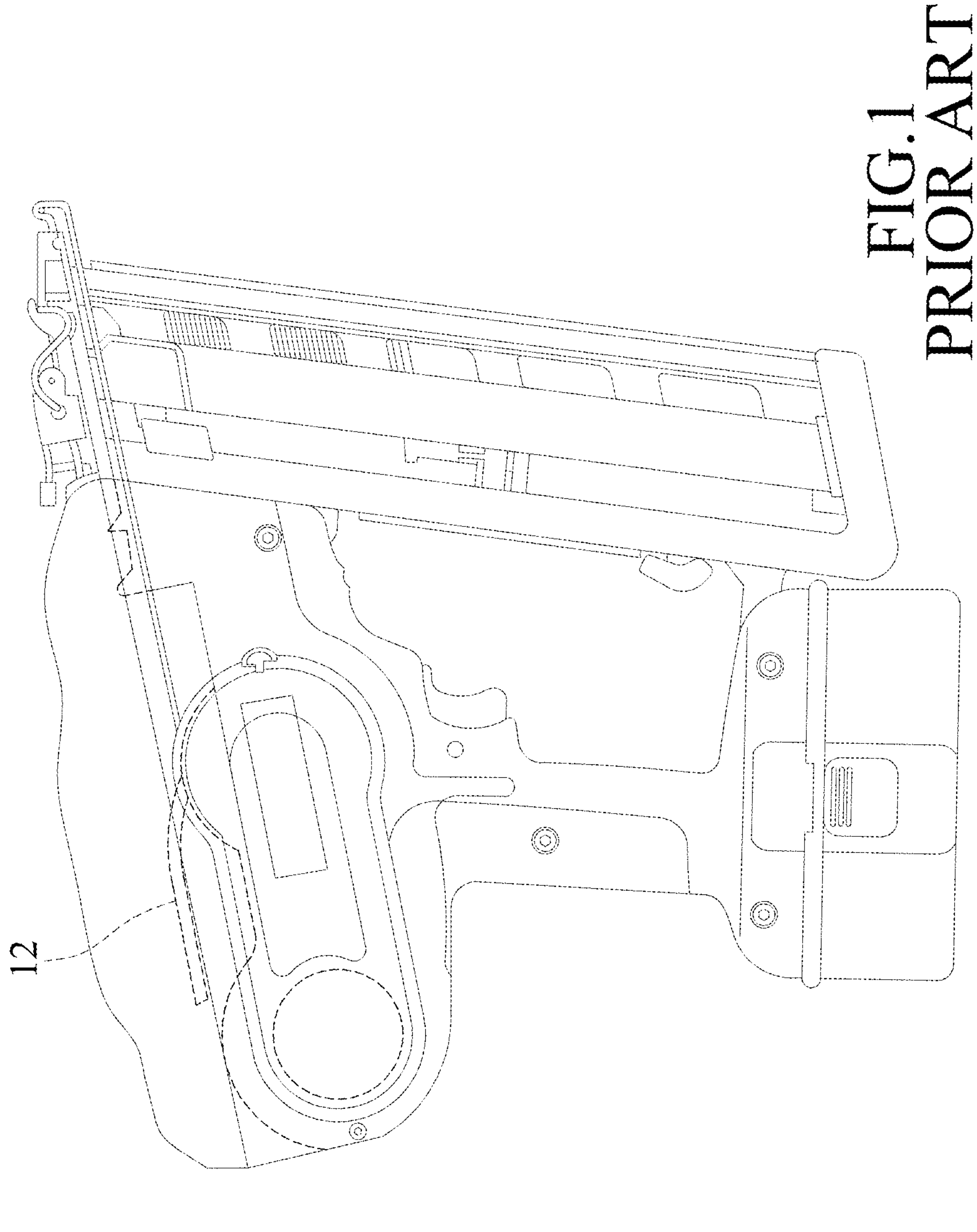
FIG.1 PRIOR ART
FIG. 1 is a side view of a power tool disclosed in Taiwanese Invention Patent Application Publication No. 200607617.
Figure 2:
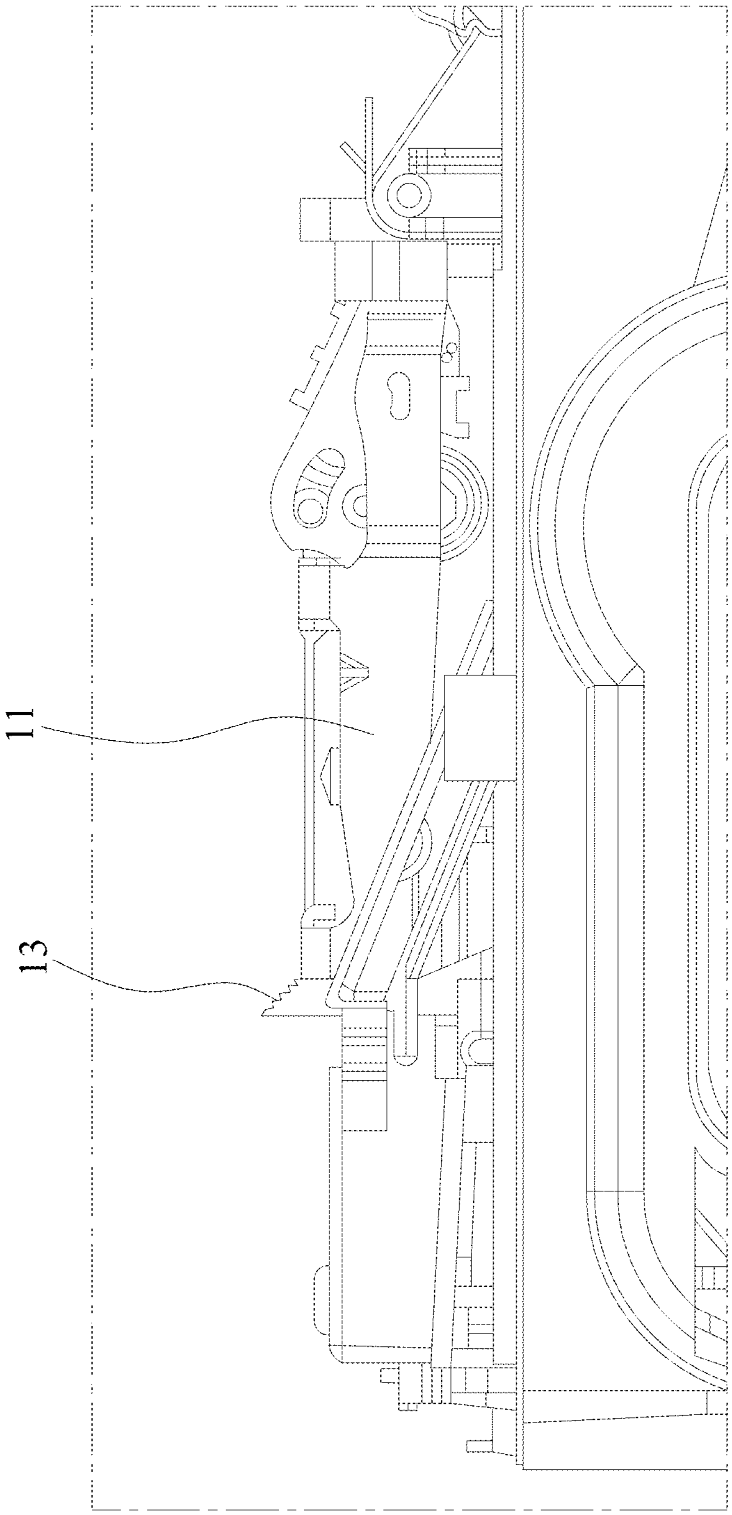
FIG.2 PRIOR ART
FIG. 2 is a fragmentary side view of a lock-out for an activation arm mechanism of the power tool.
Figure 3:
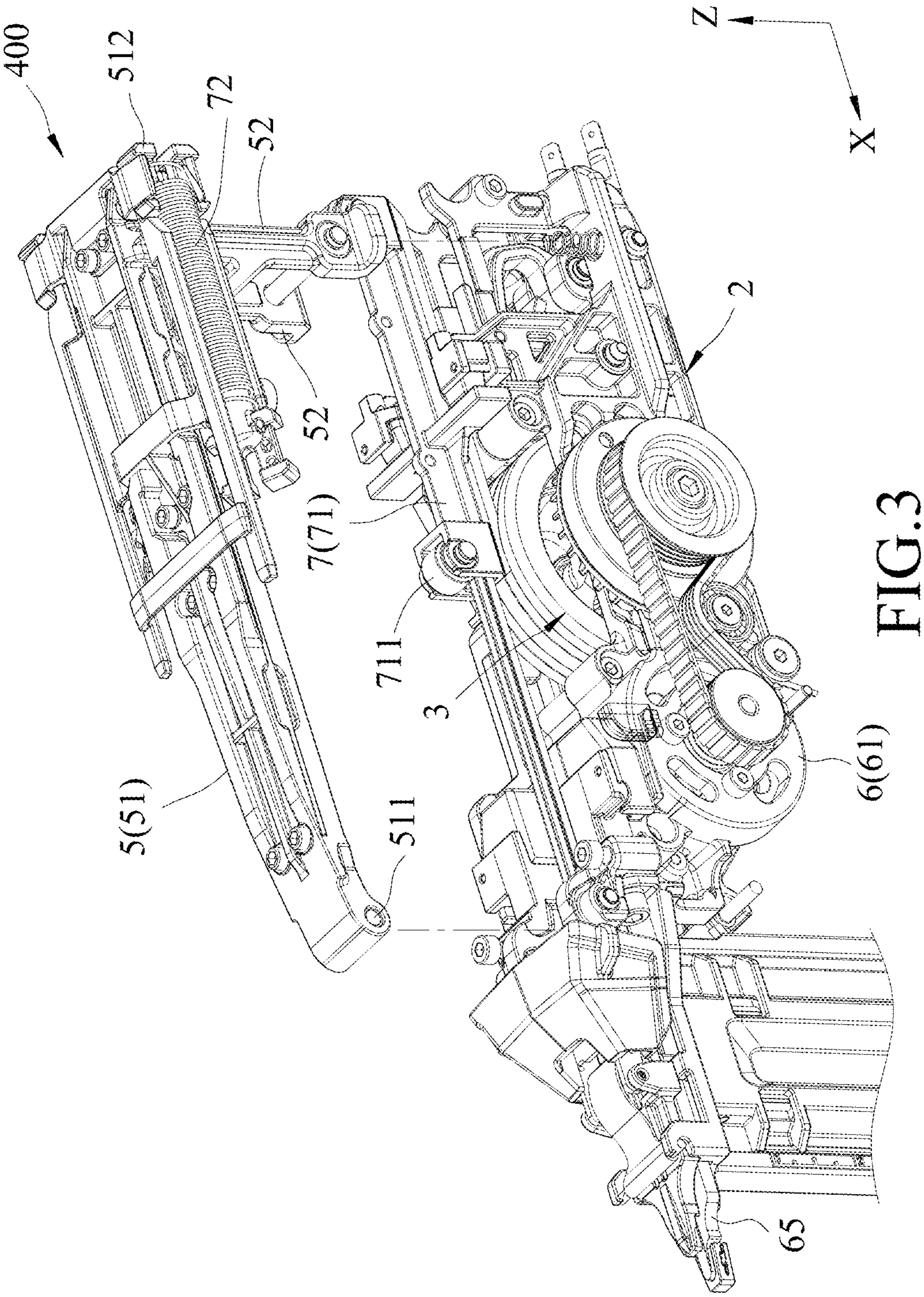
FIG. 3 is a fragmentary partly exploded perspective view of an embodiment of a nail gun according to the disclosure.
Figure 4:
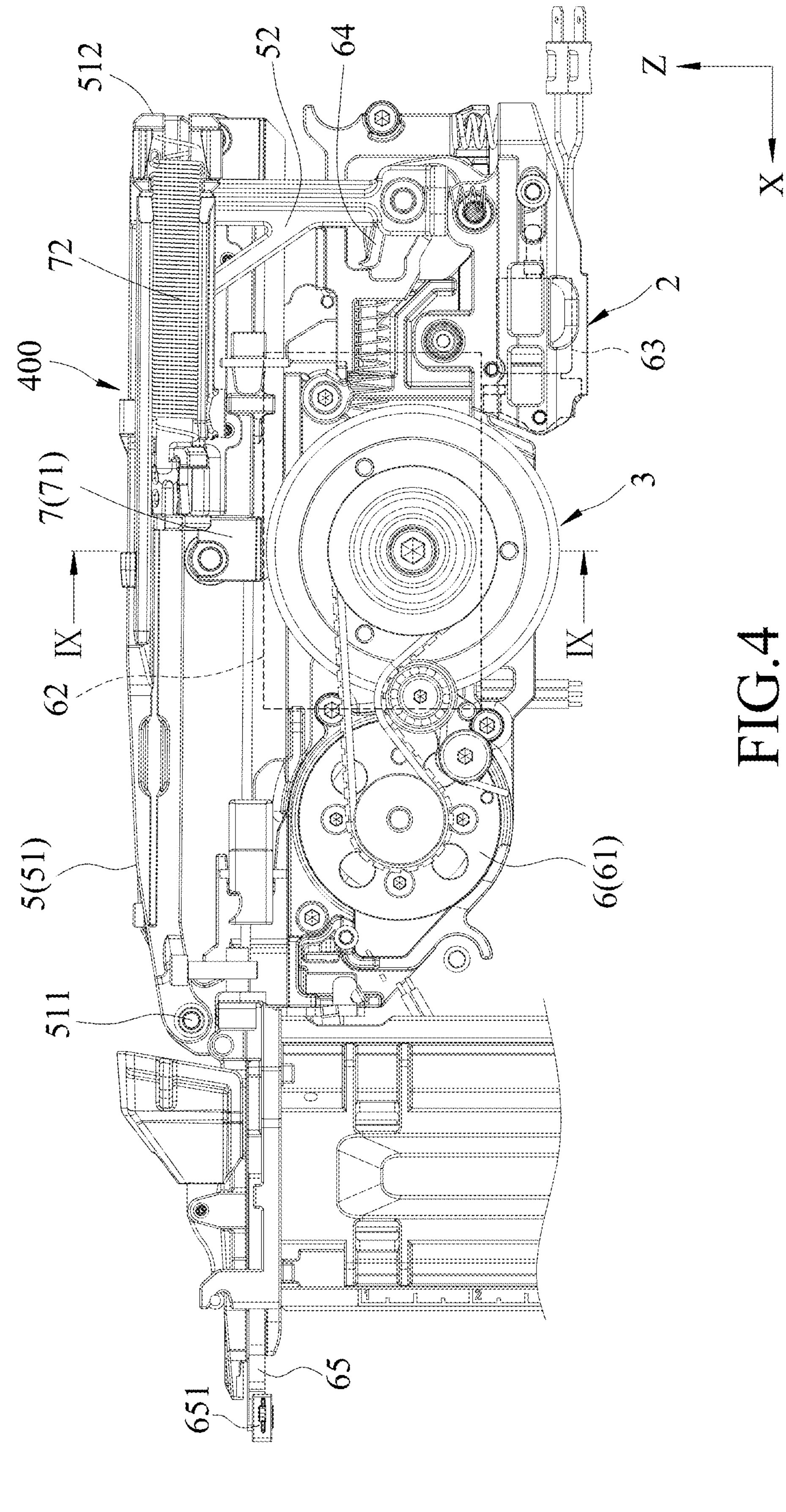
FIG. 4 is a fragmentary side view of the embodiment.
Figure 5:
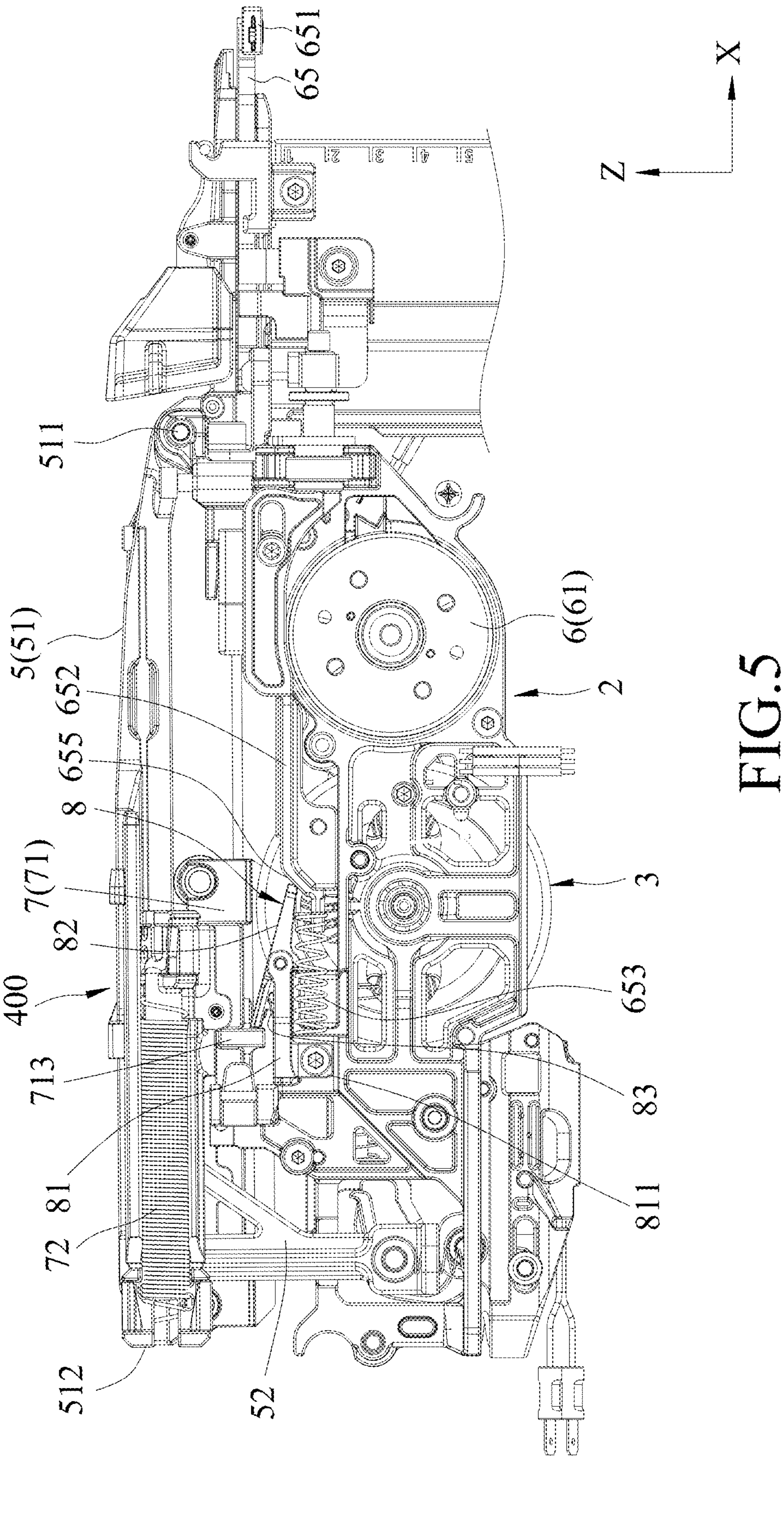
FIG. 5 is another fragmentary side view of the embodiment.

Referring to FIGS. 3 to 5, an embodiment of a nail gun according to the disclosure includes a frame unit 2, a flywheel 3 and a nail-striking device 400.

The flywheel 3 is rotatably mounted to the frame unit 2, and is actuated by electric power.

The nail-striking device 400 is mounted to the frame unit 2 and is adapted for striking nails. The nail-striking device

400 includes a swing arm unit 5, an actuation unit 6, an impact unit 7 and an accidental discharge prevention unit 8.

The swing arm unit 5 is disposed at an upper side of the frame unit 2 in an up-down direction (Z). Specifically, the swing arm unit 5 has a swing arm and two elongated arms 52. The swing arm 51 is elongated in a front-rear direction (X) perpendicular to the up-down direction (Z), and has a pivot end 511 that is pivotably mounted to the frame unit 2, and a swing end 512 that is opposite to the pivot end 511 and that is located at a rear side thereof. The elongated arms 52 are spaced apart from each other, are mounted to the swing arm 51, and extend downwardly from the swing arm 51. There will be no further description for the swing arm unit 5 since its structure and mechanism for moving are widely-understood by those skilled in the art and may have various configurations.

The actuation unit 6 is mounted to the frame unit and is operable for selectively actuating the flywheel 3. The swing arm unit 5 can be driven by the actuation unit 6 to swing relative to the frame unit 2, and the pivot end 511 of the swing arm 51 serves as a pivot when the swing arm unit 5 swings. The actuation unit 6 includes a motor 61, a control subunit 62, a solenoid valve 63, a linkage subunit and a safety subunit 65. The flywheel 3 can be driven by the motor 61 to rotate. The control subunit is electrically coupled to the motor 61 and controls rotation of the motor 61. The solenoid valve 63 is electrically coupled to the control subunit 62. The linkage subunit 64 is controlled by the solenoid valve 63 to selectively urge the elongated arms 52 of the swing arm unit 5 to move that will result in a swinging movement of the swing arm unit 5 relative to the frame unit 2. There will be no further description for how the solenoid valve 63 controls the linkage subunit 64 since it is widely-understood by those skilled in the art and may have various configurations.

Figure 6:
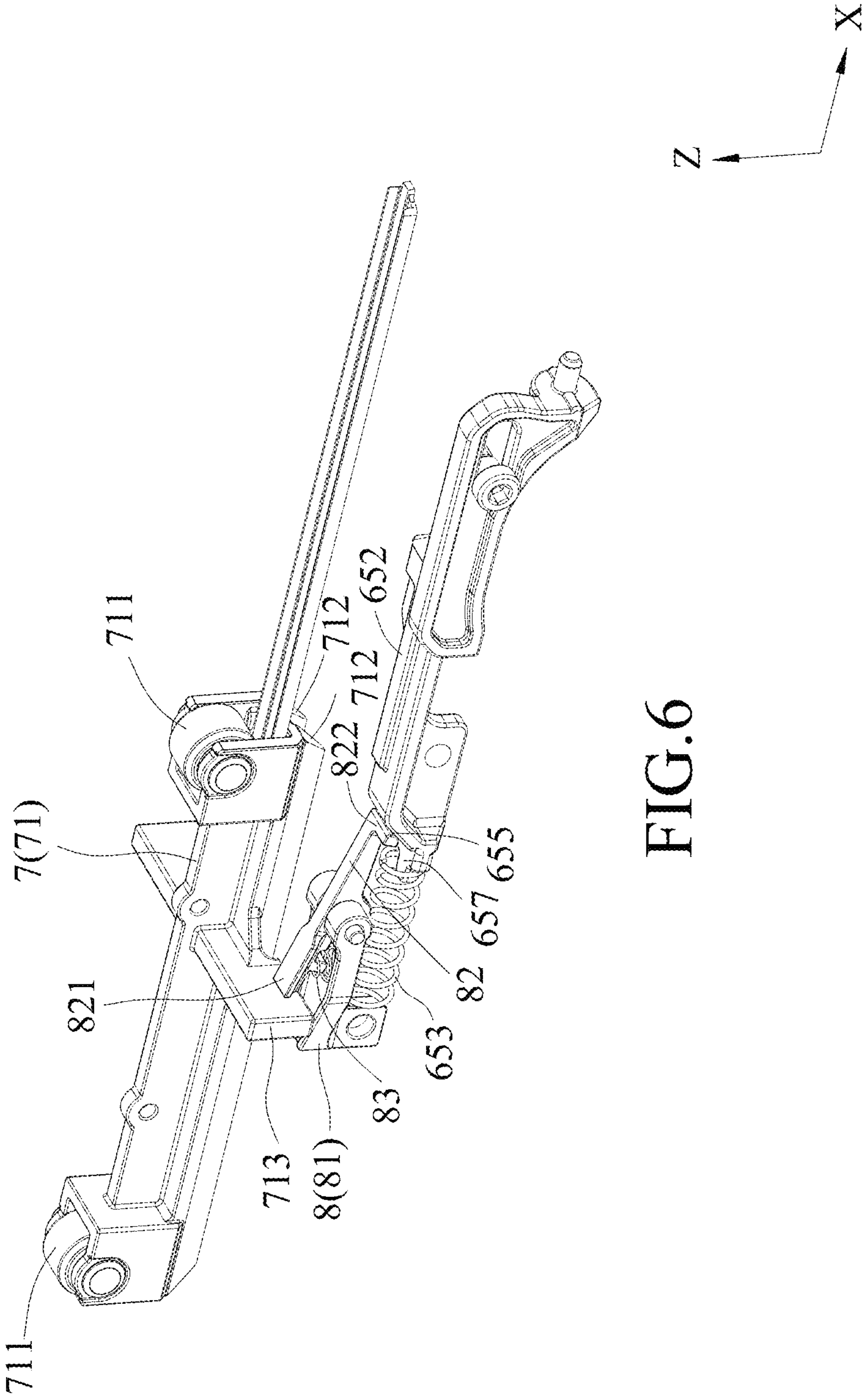
FIG. 6 is a perspective view illustrating the connection among a moving member, an accidental discharge prevention unit and an impact unit of the embodiment.
Figure 7:
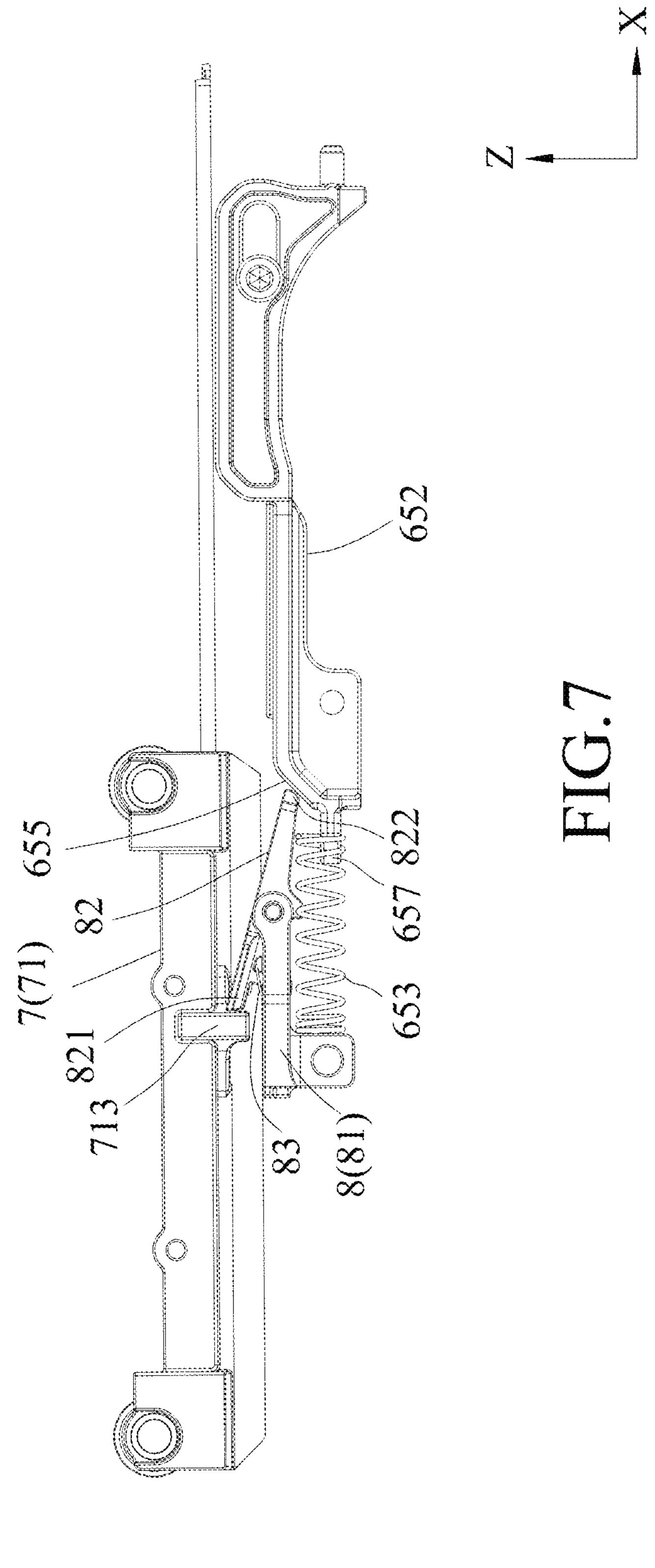
FIG. 7 is a side view illustrating a restraining member of the accidental discharge prevention unit being in a restraining state.

Referring further to FIGS. 6 and 7, the safety subunit 65 is movably mounted to the frame unit 2, and includes a contacting member 651, a moving member 652 and a first resilient member 653. The contacting member 651 is exposed from a front end of the frame unit 2. The moving member 652 and the first resilient member 653 are disposed in the frame unit 2. The moving member 652 has a pushing surface 655 and a protruding portion 657. The pushing surface 655 is inclined, and has opposite front and rear ends with the front end being above the rear end. The protruding portion 657 is located at the rear of the pushing surface 655. In this embodiment, the first resilient member 653 is configured to be a compression spring, and has two ends. One of the ends of the first resilient member 653 is disposed on the protruding portion 657. Specifically, the protruding portion 657 is surrounded by the one of the ends of the first resilient member 653. The first resilient member 653 is disposed for biasing the moving member 652 away from the swing end 512 of the swing arm 51.

Figure 8:
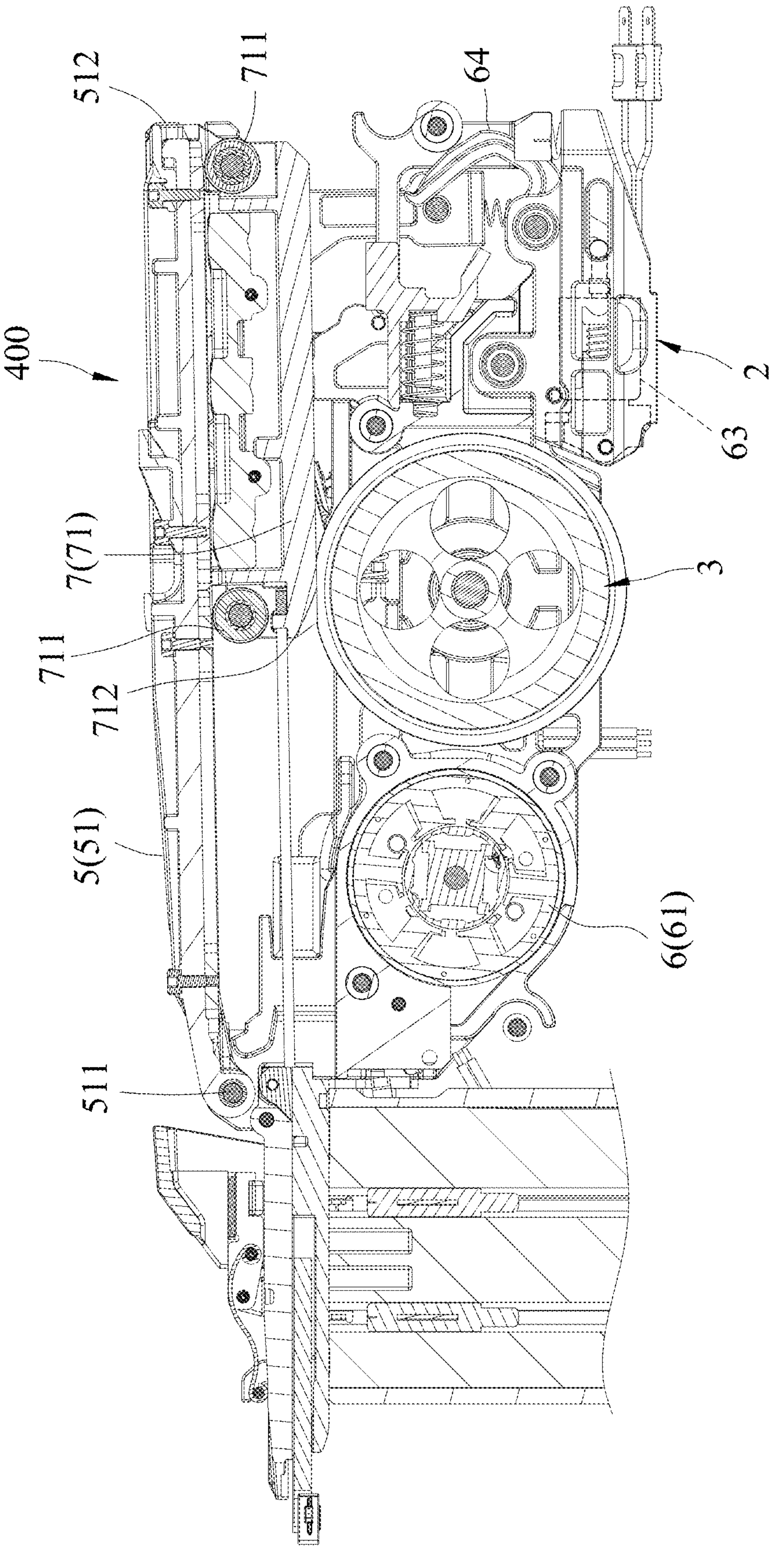
FIG. 8 is a fragmentary, sectional view illustrating an impact member of the impact unit being separated from a flywheel of the embodiment.

Referring further to FIG. 8, the impact unit 7 is slidably mounted to the swing arm unit 5, can be moved by the swing arm unit 5 to be in contact with the flywheel 3, is located under the swing arm 51 of the swing arm unit 5, and includes an impact member 71 and two restoring resilient members 72. Each of the restoring resilient members 72 is configured to be an extension spring, has two ends that are fixedly and respectively mounted to the swing arm unit 5 and the impact member 71, and is disposed for restoring the impact member 71 to its initial position. The impact member 71 has two rollers 711, two contacting portions 712 and a confining portion 713. The rollers 711 are rotatably mounted at a top side of the impact member 71 and are in slidable contact with a bottom surface of the swing arm 51. The contacting portions 712 are located at a bottom side of the impact member 71 and face the flywheel 3. The confining portion 713 is close to the pushing surface 655 of the safety subunit 65.

Figure 9:
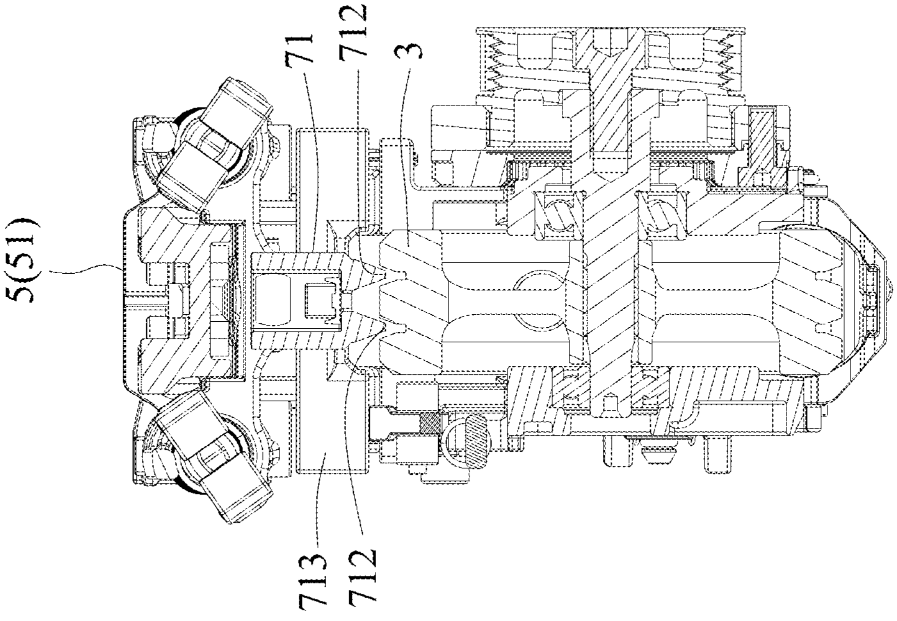
FIG. 9 is a sectional view taken along line IX-IX in FIG. 4 illustrating the impact member being separated from the flywheel.
Figure 10:
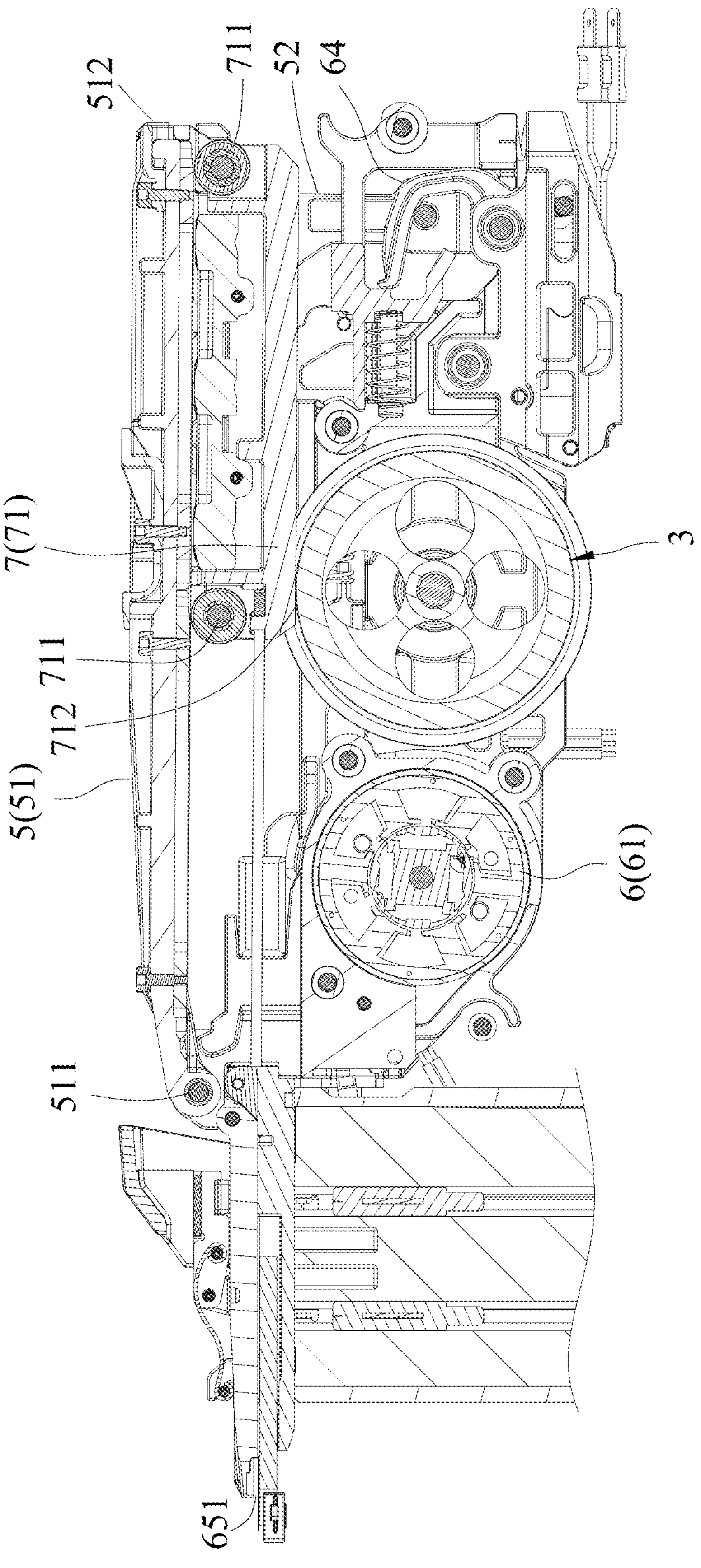
FIG. 10 is a view similar to FIG. 8, but illustrating the impact member being in contact with the flywheel.
Figure 11:
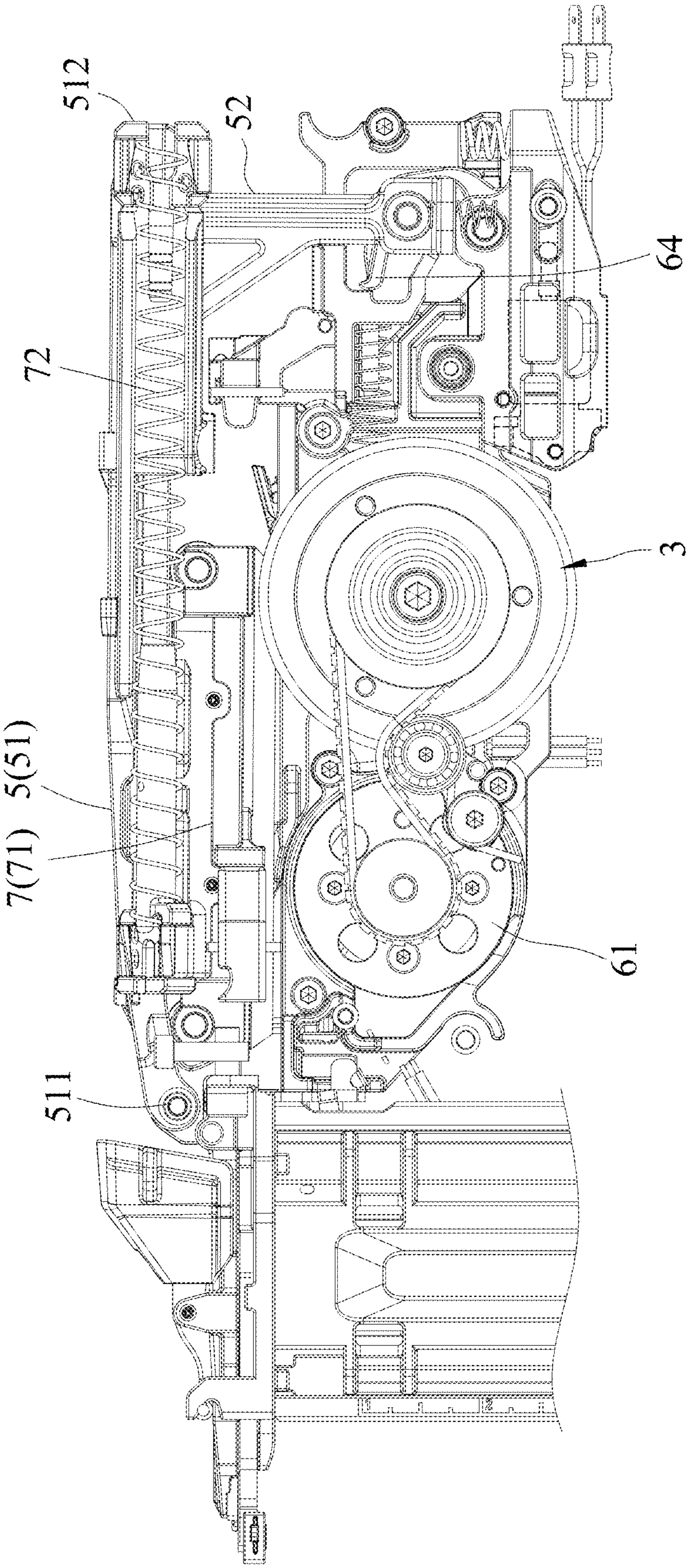
FIG. 11 is a view similar to FIG. 4 illustrating that the impact member is urged by the flywheel to strike a nail.

Referring further to FIGS. 9 to 11, when the swing arm unit 5 swings downwardly, the contacting portions 712 of the impact member 71 are brought into contact with the flywheel 3. As the contacting portions 712 are in contact with the flywheel 3, the impact member 71 is urged by rotation of the flywheel 3 to swiftly slide toward the contacting member 651 of the safety subunit 65 via the rollers 711 that slide along the swing arm 51 so as to strike a nail (not shown). The restoring resilient members 72 are extended when the impact member 71 slides toward the contacting member 651. After the nail is struck, the impact member 71 is restored to its initial position (see FIG. 4) by a pulling force provided by the restoring resilient members 72.

Figure 12:
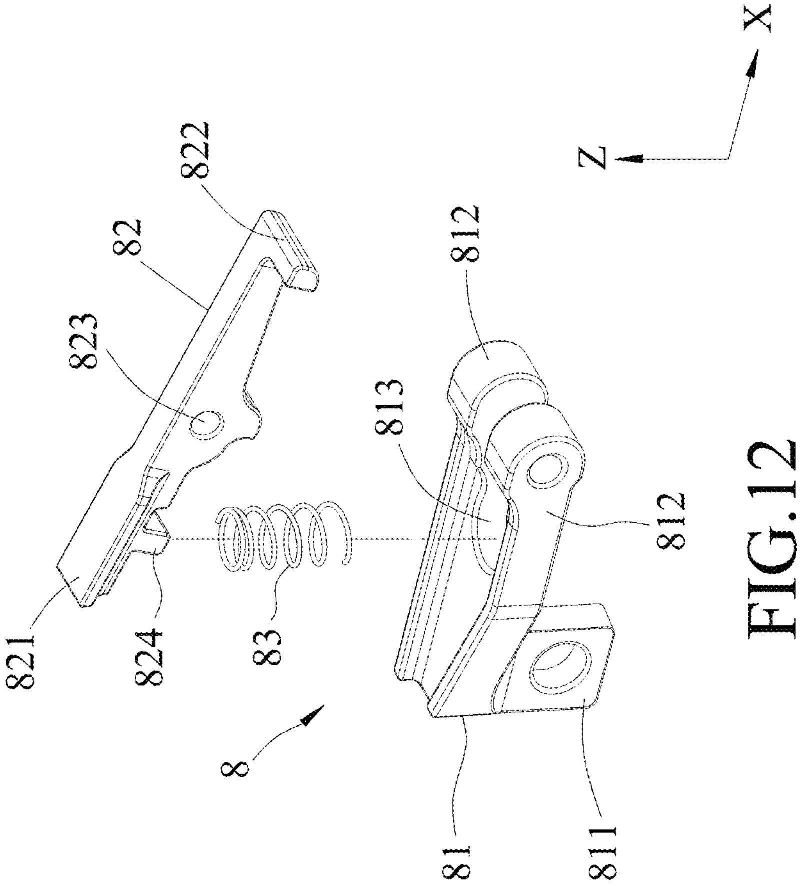
FIG. 12 is an exploded perspective view of the accidental discharge prevention unit.
Figure 13:
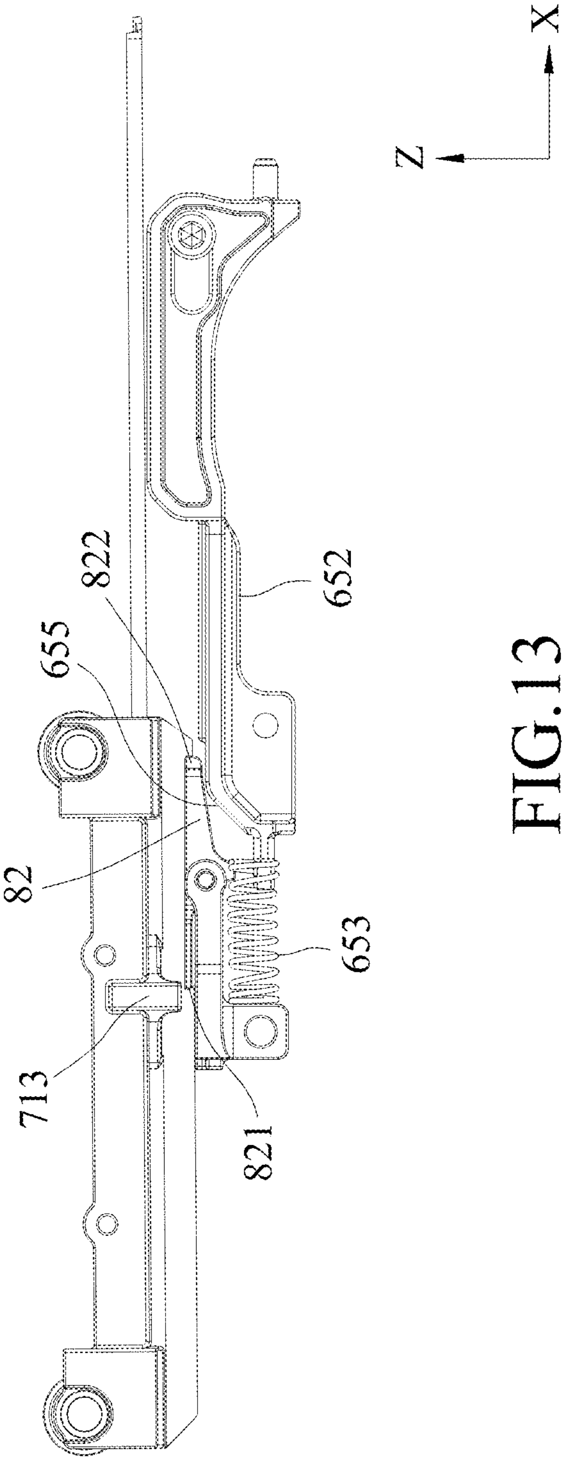
FIG. 13 is a view similar to FIG. 7, but illustrating the restraining member being in a releasing state.

Referring back to FIGS. 5 to 7, and further to FIGS. 12 and 13, the accidental discharge prevention unit 8 is mounted to the frame unit 2, and includes a fixed member 81, a restraining member and a state-converting resilient member 83. The fixed member 81 is fixedly mounted to the frame unit 2. The restraining member 82 is rotatably mounted to the fixed member 81. The other one of the ends of the first resilient member 653, which is opposite to the protruding portion 657 of the moving member 652, is disposed on the fixed member 81. The fixed member 81 has a fixing portion 811 that is fixedly mounted to the frame unit 2, and two arm portions 812 that are spaced apart from each other, that extend forwardly from the fixing portion 811, and that define a channel 813 therebetween. The restraining member 82 is located between the confining portion 713 of the impact member 71 and the pushing surface 655 of the safety subunit 65, and has a first end portion 821, a second end portion 822 and an intermediate portion 823. The first end portion 821 is adjacent to the confining portion 713 of the impact member 71, and has a protrusion 824. The second end portion 822 is adjacent to the pushing surface 655 of the safety subunit 65 and is opposite to the first end portion 821. The intermediate portion 823 is located between the first end portion 821 and the second end portion 822, and is rotatably mounted to the fixed member 81. The moving member 652 of the actuation unit 6 has one end that is adjacent to the restraining member 82 and that has the pushing surface 655. The actuation unit 6 is further operable to convert the restraining member 82 from a restraining state (see FIG. 7), in which the first end portion 821 of the restraining member restrains movement of the confining portion 713 of the impact member 71 so that the impact member 71 is prevented from moving, and in which the second end portion 822 of the restraining member 82 is in sliding contact with the pushing surface 655, to a releasing state (see FIG. 13), via sliding movement of the second end portion 822 of the restraining member 82 on the pushing surface 655. The movement of the confining portion 713 of the impact member 71 is permitted when the restraining member 82 is in the releasing state. Specifically, when the restraining member 82 is in the restraining state, the first end portion 821 thereof is located in front of the confining portion 713 of the impact member 71 and abuts against the confining portion 713 to restrain the movement of the confining portion 713 so that the impact member 71 is prevented from moving forwardly toward the contacting member 651. When the restraining member 82 is in the releasing state, the first end portion 821 thereof is located below the confining portion 713 and does not restrain the movement of the confining portion 713. The state-converting resilient member 83 extends through the channel 813, and has two ends. One of the ends of the state-converting resilient member 83 resiliently abuts against the restraining member 82, and the protrusion 824 of the restraining member 82 is surrounded by the one of the ends of the state-converting resilient member 83. The other one of the ends of the state-converting resilient member 83 resiliently abuts against the frame unit 2. The state-converting resilient member 83 is disposed for converting the restraining member 82 toward the restraining state. Specifically, when the restraining member 82 is in the releasing state, the state-converting resilient member 83 is compressed and exerts a force on the first end portion 821 of the restraining member 82 so that when the moving member 652 of the actuation unit 6 is biased away from the swing end 512 of the swing arm unit 5 by the first resilient member 653 of the actuation unit 6, the first end portion 821 of the restraining member 82 will be biased upwardly away from the fixed member 81 by the state-converting resilient member 83 (i.e., the restraining member 82 will be converted toward the restraining state by the state-converting resilient member 83). In certain embodiments, the other one of the ends of the state-converting resilient member 83 may resiliently abut against the fixed member 81, and the state-converting resilient member 83 is still disposed for converting the restraining member 82 toward the restraining state.

When a user wants to strike a nail into an object (not shown) via the nail gun, the user has to place the contacting member 651 of the safety subunit 65 so that it abuts against the object and exerts a force on the object through the contacting member 651 and the safety subunit 65 is pushed rearwardly by the object. At this time, the pushing surface 655 of the moving member 652 is moved rearwardly and pushes the second end portion 822 of the restraining member 82. By virtue of the pushing surface 655 being inclined, when the second end portion 822 is pushed by the pushing surface 655, the restraining member rotates in a manner that urges the second end portion 822 to move upwardly and that urges the first end portion 821 to move downwardly. Consequently, the restraining member 82 is converted into the releasing state by the pushing surface 655 (i.e., the impact member 71 is permitted to move). At this time, the actuation unit 6 actuates the flywheel 3 and urges the swing arm unit 5 to swing, and the impact member 71 is brought into contact with the flywheel 3 and then urged by the rotation of the flywheel 3 to move toward the contacting member 651 so as to strike a nail. That is to say, if a user does not abut the safety subunit 65 against the object and exert the force on the object through the safety subunit 65, the restraining member 82 will be kept in the restraining state. Even if the impact member 71 is accidentally brought into contact with the rotating flywheel 3, the movement of the impact member 71 is still restrained by the restraining member 82 (the impact member 71 is prevented from moving forwardly toward the contacting member 651). Therefore, by virtue of the restraining member 82 being disposed for restraining the movement of the impact member 71 toward the contacting member 651, accidental discharges of nails are prevented, and nail gun safety is improved.

When the embodiment is tested in a drop-hammer test after taking an endurance test of striking nails for one hundred and fifty thousand times, the restraining member 82 can still be kept in the restraining state upon impact of the drop-hammer, and no accidental discharge happens. Therefore, the accidental discharge prevention unit 8 is relatively durable and certainly improves nail gun safety.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A nail-striking device adapted for use with a nail gun, the nail gun including a frame unit and a flywheel that is rotatably mounted to the frame unit, said nail-striking device comprising:

an actuation unit adapted to be mounted to the frame unit and operable for selectively actuating the flywheel, and including a safety subunit that is adapted to be movably mounted to the frame unit and that has a pushing surface adapted to be located in the frame unit;

a swing arm unit having a pivot end that is adapted to be pivotably mounted to the frame unit, and a swing end that is opposite to said pivot end, and adapted to be driven by said actuation unit to swing relative to the frame unit, said pivot end serving as a pivot when said swing arm unit swings;

an impact unit slidably mounted to said swing arm unit, adapted to be moved by said swing arm unit to be in contact with the flywheel, and including an impact member that is adapted to be urged by rotation of the flywheel to strike a nail when said impact unit is brought into contact with the flywheel, and that has a confining portion close to said pushing surface; and an accidental discharge prevention unit adapted to be mounted to the frame unit, and including a restraining member that is located between said confining portion of said impact member and said pushing surface of said safety subunit, said actuation unit being further operable to convert said restraining member from a restraining state, in which said restraining member restrains movement of said confining portion of said impact member so that said impact member is prevented from moving, and in which said restraining member is in sliding contact with said pushing surface, to a releasing state, via sliding movement of said restraining member on said pushing surface, the movement of said confining portion of said impact member being permitted when said restraining member is in the releasing state.

2. The nail-striking device as claimed in claim 1, wherein: said restraining member has a first end portion that is adjacent to said confining portion of said impact member, and a second end portion that is adjacent to said pushing surface of said safety subunit and that is opposite to said first end portion; and when said restraining member is in the restraining state, said first end portion restrains the movement of said confining portion of said impact member so that said impact member is prevented from moving.

3. The nail-striking device as claimed in claim 2, wherein said accidental discharge prevention unit further includes a fixed member that is adapted to be fixedly mounted to the frame unit, said restraining member being rotatably mounted to said fixed member, and a state-converting resilient member that has two ends, one of said ends of said state-converting resilient member resiliently abutting against said restraining member, the other one of said ends of said state-converting resilient member being adapted to resiliently abut against the frame unit, said state-converting resilient member being disposed for converting said restraining member toward the restraining state.

4. The nail-striking device as claimed in claim 3, wherein said fixed member has two arm portions that are spaced apart from each other and that define a channel therebetween, said state-converting resilient member extending through said channel.

5. The nail-striking device as claimed in claim 2, wherein said accidental discharge prevention unit further includes a fixed member that is adapted to be fixedly mounted to the frame unit, said restraining member being rotatably mounted to said fixed member, and a state-converting resilient member that has two ends, one of said ends of said state-converting resilient member resiliently abutting against said restraining member, the other one of said ends of said state-converting resilient member resiliently abutting against said fixed member, said state-converting resilient member being disposed for converting said restraining member toward the restraining state.

6. The nail-striking device as claimed in claim 3, wherein said first end portion of said restraining member has a protrusion that is surrounded by the one of said ends of said state-converting resilient member.

7. The nail-striking device as claimed in claim 1, wherein said safety subunit of said actuation unit includes:

a moving member that is adapted to be disposed in the frame unit, and that has one end adjacent to said restraining member of said accidental discharge prevention unit and having said pushing surface; and a first resilient member that is adapted to be disposed in the frame unit, and that is disposed for biasing said moving member away from said swing end of said swing arm unit.

8. The nail-striking device as claimed in claim 7, wherein said moving member of said safety subunit further has a protruding portion, one end of said first resilient member being disposed on said protruding portion.

9. A nail gun comprising:

a frame unit;

a flywheel rotatably mounted to said frame unit; and the nail-striking device as claimed in claim 1 mounted to said frame unit and adapted for striking nails.

10. The nail gun as claimed in claim 9, wherein:

said restraining member of said accidental discharge prevention unit of said nail-striking device has a first end portion that is adjacent to said confining portion of said impact member, and a second end portion that is adjacent to said pushing surface of said safety subunit and that is opposite to said first end portion; and when said restraining member is in the restraining state, said first end portion restrains the movement of said confining portion of said impact member so that said impact member is prevented from moving.

11. The nail gun as claimed in claim 9, wherein:

said accidental discharge prevention unit of said nail-striking device further includes a fixed member that is fixedly mounted to said frame unit, said restraining member being rotatably mounted to said fixed member, and a state-converting resilient member that has two ends, one of said ends of said state-converting resilient member resiliently abutting against said restraining member, the other one of said ends of said state-converting resilient member resiliently abutting against one of said fixed member and said frame unit, said state-converting resilient member being disposed for converting said restraining member toward the restraining state.

* * * * *